Nov. 20, 1934.  H. L. COOKE  1,980,981
METHOD AND APPARATUS FOR CONSTRUCTING MULTIPLE
SCALE REPRESENTATIONS OF OBJECTS
Filed Oct. 8, 1930  4 Sheets-Sheet 1

INVENTOR
HEREWARD LESTER COOKE
BY
ATTORNEYS

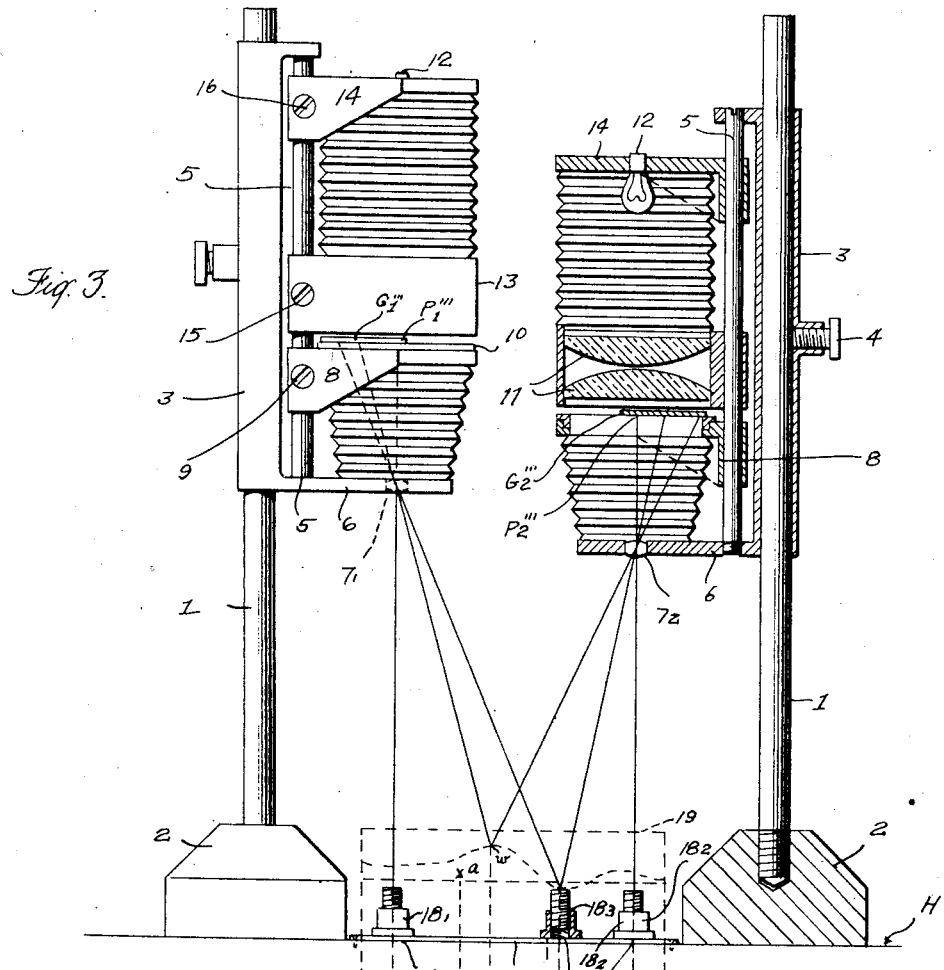
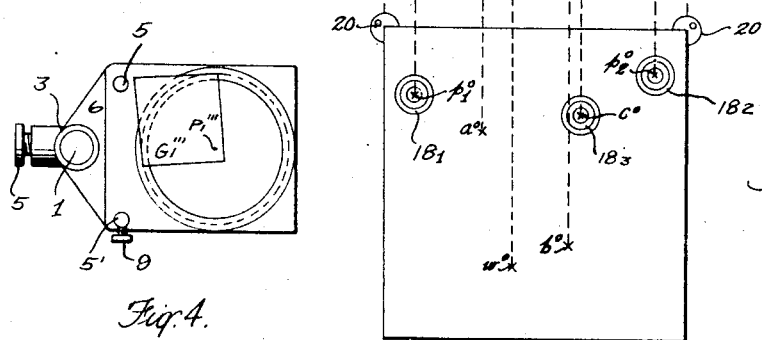

Nov. 20, 1934.  H. L. COOKE  1,980,981
METHOD AND APPARATUS FOR CONSTRUCTING MULTIPLE
SCALE REPRESENTATIONS OF OBJECTS
Filed Oct. 8, 1930  4 Sheets-Sheet 3
Fig. 8.
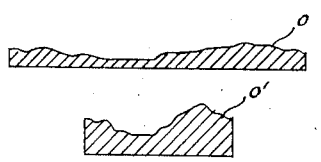
Fig. 9.
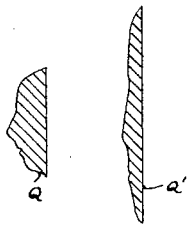
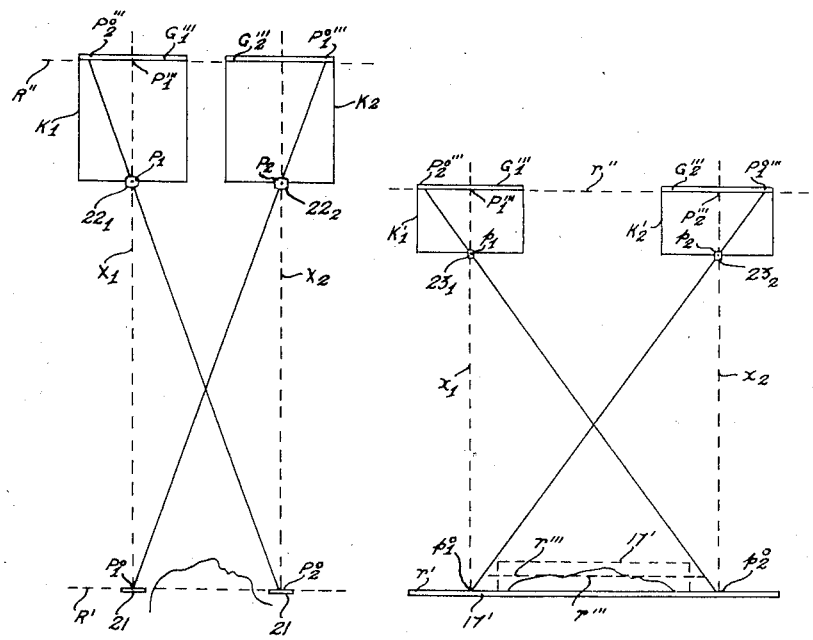
Fig. 6.  Fig. 7.
INVENTOR
HEREWARD LESTER COOKE
BY
ATTORNEY

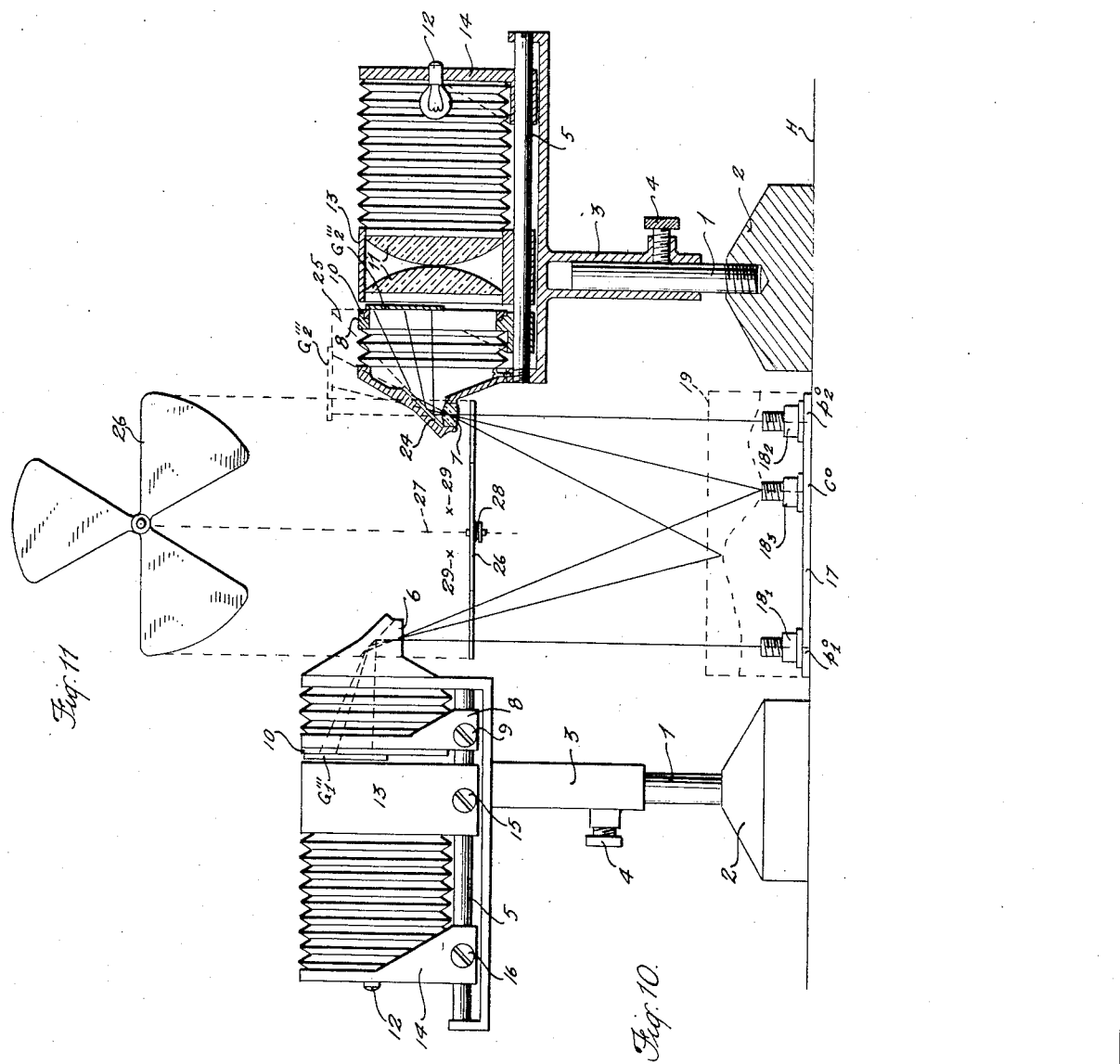

Patented Nov. 20, 1934

1,980,981

UNITED STATES PATENT OFFICE 1,980,981

METHOD AND APPARATUS FOR CONSTRUCTING MULTIPLE SCALE REPRESENTATIONS OF OBJECTS

Hereward Lester Cooke, Princeton, N. J.

Application October 8, 1930, Serial No. 487,175

7 Claims. (Cl. 41—25)

This invention relates to a method of and apparatus for making models of objects in which the scales of the models parallel to three mutually perpendicular axes are not necessarily the same. The present invention relates particularly to relief maps and to methods of making same from aerial photographs of the terrain to be mapped. My improved method is also applicable to the reproduction of existing objects on a changed scale and particularly on a vertical scale which is altered with respect to the horizontal scales. The method of the present invention differs from known methods of photosculpture in that it provides a direct stereoscopic method for securing a desired combination of different scales in different directions for the same model, and in other features which represent an advance in the art. In carrying out the invention it is necessary to employ at least two photographs of the object of which a model is to be produced, the photographs being taken from different positions.

In the accompanying drawings, which form a part of this specification:

Figure 3 is an elevation, partly in section, of apparatus employed in the construction of models;

Figures 4 and 5 are plans of portions of the apparatus shown in Figure 3;

Figures 6 and 7 are diagrammatic elevations of photographic and projection apparatus arranged in a definite manner for the production of models;

Figures 8 and 9 are sectional elevations illustrating the variations in scale which may be produced in models by the methods of this invention;

Figure 10 is an elevation, partly in section, of a preferred form of apparatus; and Figure 11 is a plan of part of the apparatus shown in Figure 10, constituting a form of shutter employed for stereoscopic vision.

Figure 1:
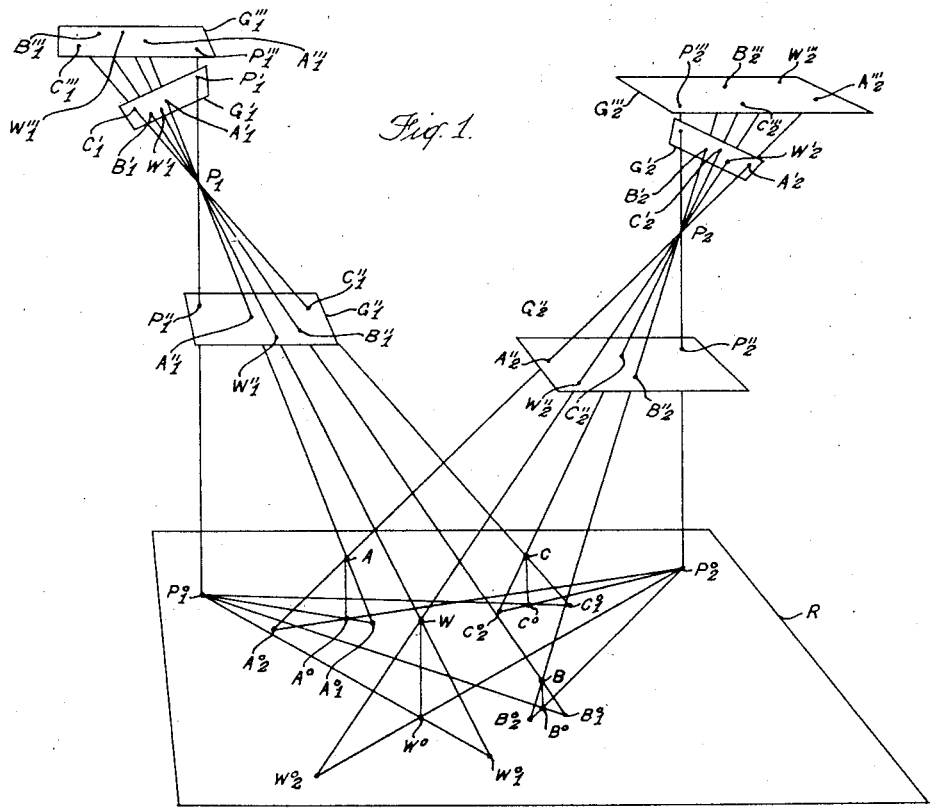
Figure 1 is a diagrammatic view in perspective of points in an object photographed from two different positions, of the two corresponding photographs, and of certain projections of these photographs arranged in a definite manner.

A clear understanding of the principles of the present invention may be arrived at by considering its application to a definite problem. In Figure 1 let A, B, C, W represent points in terrain of which photographs $G_1'$, $G_2'$ have been obtained from the lens positions, or projection centers, $P_1$, $P_2$. If the positions in space of three points A, B, C are known, being for instance referred to two known mutually perpendicular axes in the horizontal plane of reference R, then it is possible, for instance by the methods described in my United States Patent No. 1,713,498, to determine the positions $P_1$, $P_2$, referred to the said axes, to produce horizontalized, or "rectified" projections $G_1''$, $G_2''$ of the photographs $G_1'$, $G_2'$ to a known scale, to obtain photographic positives of these projections, and to locate in the plane of the said positives the points $P_1''$, $P_2''$ where the verticals through $P_1$, $P_2$ cut the respective planes of these positives. The points $P_1''$, $P_2''$ do not necessarily lie within the area recorded photographically in the positives $G_1''$, $G_2''$.

Let $P_1^0$, $P_2^0$ be the projections of $P_1$, $P_2$ on the reference plane R. In carrying out the method of securing rectified projections $G_1''$, $G_2''$ of the photographic negatives $G_1'$, $G_2'$, as described in my United States patent cited above, the distances $$\overline{P_1P_1''}, \overline{P_1P_1^0}, \overline{P_2P_2''}, \overline{P_2P_2^0}$$

may be determined in an obvious manner. It is evident that the scale of the projection $A_1''$, $B_1''$, $C_1''$, $W_1''$ of the points A, B, C, W relative to the scale of the corresponding projection $A_1^0$, $B_1^0$, $C_1^0$, $W_1^0$ of the same points on the reference plane R is the same as the ratio of the distance $$\overline{P_1P_1''}$$

to the distance $$\overline{P_1P_1^0}.$$

Let this ratio be designated as $1/N_1$; and let the corresponding ratio for the corresponding projections through the projection center $P_2$ be designated as $1/N_2$. $1/N_1$ and $1/N_2$ are then the respective scales of the photographic positives $G_1''$, $G_2''$ relative to the corresponding projections in nature on the reference plane R.

Let $G_1'''$, $G_2'''$ be photographic negatives printed by contact with the respective positives $G_1''$, $G_2''$. It is evident that $G_1'''$ is identical with $G_1''$, but reversed; and that similarly $G_2'''$ is $G_2''$ reversed. If now the negatives $G_1'''$, $G_2'''$ were placed in horizontal positions, located and oriented as shown in Figure 1, with the distance $$\overline{P_1P_1'''}$$

equal to $$\overline{P_1P_1''},$$

and $$\overline{P_1P_2'''}$$

equal to $$\overline{P_2P_2''},$$

and projected through the centers $P_1$, $P_2$ respectively, it is obvious that corresponding rays, such as those from $W_1'''$, $W_2'''$, would meet in nature, as at the point W, and so determine by their intersections the positions in nature of all objects shown in both negatives $G_1'''$, $G_2'''$.

The geometry of the method of this invention for forming required models will now be considered. Suppose that it is required to produce a three dimensional model, or relief map, of the terrain A, B, C, W in which the vertical scale is to be in any desired ratio to the two horizontal scales, which are to be equal. Let the horizontal scales of the required model be $1/N$, and the vertical scale be $n/N$, referred to nature, N and $n$ being arbitrarily chosen numbers. For instance, if N is taken as 63,360, the horizontal scale of the model will be one inch to the mile, and if $n$ is taken as 4, the vertical scale will be one inch to one quarter mile, or four times as great as the horizontal scales.

Since the positions in space of the points $P_1$, $P_2$, A, B, C are known, the projections $P_1^o$, $P_2^o$, $A^o$, $B^o$, $C^o$ of these points on the reference plane R and the respective heights of these points above the said plane are determined.

Figure 2:
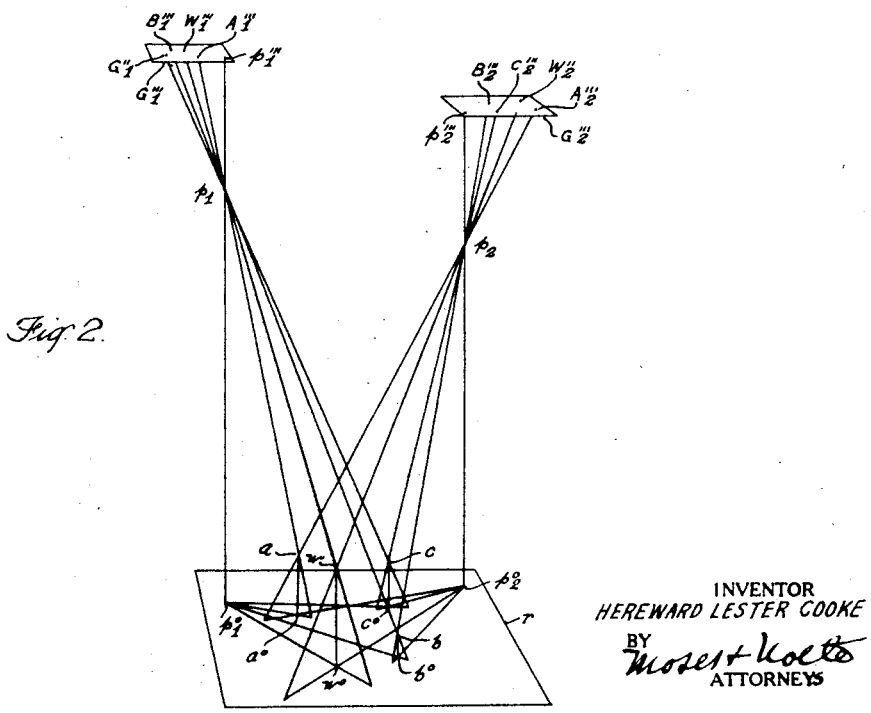
Figure 2 is a diagrammatic view in perspective of projections shown in Figure 1, arranged in a definite manner for producing a model.

A flat horizontal reference surface $r$, Figure 2, is now prepared, and on it are located points $p_1^o$, $p_2^o$, $q^o$, $b^o$, $c^o$, which have the same relative configuration as the points $P_1^o$, $P_2^o$, $A^o$, $B^o$, $C^o$, Figure 1, reduced to the scale $1/N$. The points $p_1$, $p_2$, $a$, $b$, $c$ can now be located vertically above the points $p_1^o$, $p_2^o$, $a^o$, $b^o$, $c^o$ at heights $$\overline{p_1^op_1},\ \overline{p_2^op_2},\ \overline{a^oa},\ \overline{b^ob},\ \overline{c^oc}$$

to the scale $n/N$ relative to the corresponding heights in nature $$\overline{P_1^oP_1},\ \overline{P_2^oP_2},\ \overline{A^oA},\ \overline{B^oB},\ \overline{C^oC},$$

Figure 1.

The photographic negatives $G_1'''$, $G_2'''$ are now placed in horizontal positions, as shown in Figure 2, above the points $p_1$, $p_2$ respectively, with the points $P_1'''$, $P_2'''$ on the verticals through $p_1$, $p_2$ respectively, and with the heights $p_1P_1'''$, $p_2P_2'''$ such that the ratio of $$\overline{p_1P_1'''} \text{ to } \overline{p_1p_1^o}$$

is equal to $N/N_1$, and the ratio of $$\overline{p_2P_2'''} \text{ to } \overline{p_2p_2^o}$$

equal to $N/N_2$. The negatives $G_1'''$, $G_2'''$ are then adjusted, in their own planes, by rotation about the points $p_1$, $p_2$ respectively, until the projections of a pair of corresponding points, such as $C_1'''$ $C_2'''$, through the respective projection centers $p_1$, $p_2$, coincide in the corresponding point $c$. Consideration will show that when these adjustments have been effected the rays from all corresponding pairs of images on the negatives $G_1'''$, $G_2'''$ intersect in space, as at the points $a$, $b$, $c$, $w$, which will then form a reproduction of the corresponding configuration A, B, C, W in nature, the horizontal scales of the said reproduction being $1/N$, and the vertical scale being $n/N$. If a surface be now formed passing through all points of intersection of pairs of corresponding rays, such as the points $a$, $b$, $c$, $w$, this surface will form a model, to the required scales, of the arrangement of the corresponding points in nature.

Apparatus will now be described for carrying out in practice the operations necessary in applying the theory described above.

In Figure 3 the cameras and supports and supports shown on the left and right are identical in construction. Uprights 1, mounted in heavy bases 2, are arranged so as to be movable at will on the horizontal surface H. Travelling members 3, arranged for vertical adjustment on the uprights 1, may be secured at any desired height by means of the set screws 4. The members 3 have rigidly attached to them pairs of parallel vertical rods 5, and horizontal platforms 6, as shown in Figures 3 and 4. Lenses $7_1$, $7_2$ are mounted in openings in the platforms 6, with their axes vertical. Supports 8 (Figures 3 and 4), of the form shown, capable of vertical adjustment on the parallel rods 5, may be secured at any desired height by means of the set screws 9, and have circular openings in which plateholders 10 may be rotated about vertical axes coinciding with the axes of the lenses $7_1$, $7_2$ respectively. Condensing lenses 11 and sources of illumination 12, arranged as shown, are supported respectively on vertically adjustable members 13 and 14, which may be secured at desired heights by means of their respective set screws 15 and 16. A flat board 17, Figures 3 and 5, resting on the horizontal surface H, has resting on it the circular registration markers $18_1$, $18_2$, $18_3$, in which screws are concentrically carried, having crosses or suitable markings at the centers of their flat tops. The heights of the said crosses above the upper surface of the board 17 may be adjusted by operation of the screws on which they are carried, and the markers may be slid from place to place on the board 17, so that the markers may be placed in any spacial position above the board 17.

The operation of the apparatus shown in Figures 3, 4 and 5 will now be described.

Of the three points A, B, C, of known position in nature, one, say the point C, of intermediate height, is chosen, and on the board 17 the points $p_1^o$, $p_2^o$, $c^o$ are located, (Figures 2, 3 and 5), so as to form the same relative configuration as the points $P_1^o$, $P_2^o$, $C^o$ in nature, (Figure 1) reduced to the scale $1/N$. The screws of the markers $18_1$, $18_2$, $18_3$ are now adjusted so that the heights of the crosses on all three markers above the upper surface of the board 17 are equal to the height $$\overline{C^oC}$$

in nature, reduced to the scale $n/N$. The markers $18_1$, $18_2$, $18_3$ are then moved on the board 17 until the crosses on these markers lie vertically above the located points $p_1^o$, $p_2^o$, $c^o$ respectively.

The points $p_1$, $p_2$, (Figure 3), are now located above the points $p_1^o$, $p_2^o$ at heights $$\overline{p_1^op_1},\ \overline{p_2^op_2}$$

equal respectively to the heights $$\overline{P_1^oP_1},\ \overline{P_2^oP_2}$$

in nature, reduced to the scale $n/N$.

The lenses $7_1$, $7_2$, of focal lengths as hereinafter specified, are mounted in the cameras as shown in Fig. 3. By adjusting the heights of the members 3 of the two cameras, the external principal points of the lenses $7_1$, $7_2$ are placed respectively at the levels of the points $p_1$, $p_2$, previously located, the term "external principal point" being herein employed to signify that principal point of the lens corresponding to the projection center of rays passing out from the camera in which the lens is mounted.

The negatives $G_1'''$, $G_2'''$ are now placed, image side down, on the circular plateholders 10, as shown in Figures 3 and 4, with the points $P_1'''$, $P_2'''$ lying at the centers of the said plateholders, on the respective axes of the lenses $7_1$, $7_2$.

Let $D_1$, $D_2$ be the respective separations of the principal points of the lenses $7_1$, $7_2$. By means of the movable members 8 the heights of the negatives $G_1'''$, $G_2'''$ are so adjusted that the ratio of $$\overline{p_1P_1'''} \pm D \text{ to } \overline{p_1p_1^0}$$

is equal to the ratio of N to $N_1$, and the ratio of $$\overline{p_2P_2'''} \pm D \text{ to } \overline{p_2p_2^0}$$

equal to the ratio of N to $N_2$, the quantities N, $N_1$ and $N_2$ having the values previously specified.

The lenses $7_1$, $7_2$ are chosen of focal lengths such that after the above adjustments have been effected the images of the negatives $G_1'''$, $G_2'''$ are focused approximately on the horizontal plane $r'$ at the estimated average height of the points $a$, $b$, $c$, $w$; and in operation these lenses are employed with diaphragm openings sufficiently small to give adequate depth of focus for carrying out the processes described.

The two cameras are now moved on the horizontal surface H until the external principal points of the lenses $7_1$, $7_2$ occupy the positions $p_1$, $p_2$, previously located, which will be indicated when the projected images of the points $P_1'''$, $P_2'''$ on the negatives $G_1'''$, $G_2'''$ coincide with the crosses on the markers $18_1$, $18_2$ respectively.

In using the two cameras shown in Figure 3 for projecting optical images the members 13, 14, controlling the positions of the condensing lenses 13 and light sources 14 are of course adjusted to give good uniform illumination of the projected images, and locked in position by means of the set screws 15, 16.

The circular plateholders of the two cameras are now rotated about the points $P_1'''$, $P_2'''$ until the projected images of $C_1'''$, $C_2'''$ both coincide with the crosses on the marker 18, slight vertical adjustments of the members 8 being resorted to, if necessary, to secure this result in practice.

After the foregoing adjustments are completed the two cameras are in readiness to carry out all the subsequent operations in connection with the construction of the required model, and no further alterations of adjustment are necessary.

The markers $18_1$, $18_2$, $18_3$ are now removed and a block 19 of plaster of Paris or other suitable material is secured to the board 17, the said block being of such dimensions as to include the estimated surface of the required model. Stops 20 are secured to the surface H in contact with the corners of the board 17 so that the said board and block 19 may be removed and subsequently returned into exact registration with its original position, as shown.

Arrangements must now be made to view stereoscopically the images of the negatives $G_1'''$, $G_2'''$ projected by the lenses $7_1$, $7_2$ on the block 19. This may be accomplished by projecting the two images through two transparent screens of complementary colors and viewing these colored images through two screens of correspondingly colored glass, anaglyphically, in a well known manner; or the two images may be cast alternately in rapid succession on the block 19 and a suitable synchronized mechanism employed to afford alternate clear vision of the images to the two eyes of the worker, as hereinafter described; or any other suitable known means for securing plastic vision of the two images may be employed.

The method of forming the model will now be described. This is effected by cutting, filing, scraping, modelling, or in general forming or sculpturing the block 19 by means of suitable implements and materials until all parts of the stereoscopic image as viewed by the worker appear to lie on the surface of the modelled block 19. No further modelling of the block is required after this result has been attained.

The block 19 is now removed from the surface H and thinly coated with a suitable waterproof substance, such as celluloid varnish. It is then photographically sensitized on its modelled surface. This may be accomplished by spraying, or by any other suitable method, this operation of course being carried on in a photographically safe light.

Still using the safelight the block 19 is now returned to its position in register with the stops 20 on the surface H, and the image of $G_1'''$, or of $G_2'''$, or of $G_1'''$ and $G_2'''$ combined is cast in white light on its surface for a period calculated to give correct photographic exposure. The latent photographic image thus formed on the block 19 is then developed by spraying or washing the surface with developer, and the image is then fixed, washed and dried. The result is a relief map of the terrain A, B, C, W, Figure 1, having horizontal scales 1/N and a vertical scale $n/N$, with the detail of the terrain recorded photographically on its surface.

Models made in this way may be colored by hand or by any known color photography process, contour lines may be drawn on it by tracing on its surface all points lying at definite heights to the scale $n/N$ above the upper surface of the board 17, names of towns, rivers, etc., may be printed on it, and other desirable information about the terrain recorded on its surface in a suitable manner. Replicas may be made by flooding the surface of the original model with plaster of Paris or other suitable material, and casting replicas in the mold thus formed. Photographic detail and other information may be placed on the surfaces of the replicas by the methods already described in connection with the original model.

Models formed by the method described constitute valuable relief maps for military, commercial, civil and geographic purposes. If at any time changes in development of terrain call for new editions of these relief maps, the surface images may be removed, the surfaces resensitized, and prints from later photographs and later information recorded on the surface of the original model by the methods hereinbefore described. If extended areas are to be mapped by this process a series of rectangular blocks, covering say one square mile each, may be made, and assembled at will to form a continuous relief map of all or any desired portion of the area covered.

Multiple scale models of objects in either increased, natural or diminished relief may be made by the process hereinbefore described by choosing the value of $n$ greater than, equal to, or less than unity.

The process becomes considerably simplified if the photographs can be taken by means of cameras arranged in definite known positions. Referring to Figures 6 and 7, let M be an object of which a multiple scale model is required. Cameras $K_1$, $K_2$, shown diagrammatically, are arranged with their axes $X_1$, $X_2$ parallel, and normal to a chosen plane of reference $R'$. Let the axes $X_1$, $X_2$ cut the plane $R'$ at the points $P_1^0$, $P_2^0$ respectively. Lenses $22_1$, $22_2$, of equal focal length, are employed in the cameras $K_1$, $K_2$, and are placed with their axes coinciding with the axes $X_1$, $X_2$ respectively, and with their external principal points $P_1$, $P_2$ equidistant from the plane $R'$. Markers 21 with crosses on them are placed in the plane $R'$ with the crosses lying at the points $P_1^0$, $P_2^0$. The cameras $K_1$, $K_2$ are focussed on the object M and crosses on the markers 21, with photographic plates $G_1'''$, $G_2'''$ arranged in the same plane R, parallel to R'. The plates $G_1'''$, $G_2'''$ are then exposed and developed, and thereby become what will be referred to hereinafter as the negatives $G_1'''$, $G_2'''$, which will be used stereoscopically in producing the required model. $P_2^{0'''}$, $P_1^{0'''}$ are the points on the said negatives where the images of the crosses on the markers 21 are located.

Let 1/N be the required scale of the model in directions normal to the axes $X_1$, $X_2$, and $n/N$ the scale parallel to these axes.

A surface $r'$ is prepared, and on it are located and marked two positions $p_1^0$, $p_2^0$ separated by a distance equal to the distance $$\overline{P_1^0 P_2^0},$$

Figure 6, to the scale 1/N. Let $x_1$, $x_2$ be lines through $p_1^0$, $p_2^0$ normal to the surface $r'$, Figure 7. On these lines or axes $x_1$, $x_2$ points $p_1$, $p_2$ are located at a distance from the plane $r'$ equal to the distance $$\overline{P_1^0 P_1},$$

Figure 6, to the scale $n/N$.

Projection cameras $K_1'$, $K_2'$ are fitted with projection lenses $23_1$, $23_2$, of focal lengths as hereinafter specified. The cameras $K_1'$, $K_2'$ are placed in position with the axes of the projection lenses coinciding with the axes $x_1$, $x_2$ as shown, and with the external principal points of the said lenses coincident with the points $p_1$, $p_2$.

The scale of the negatives $G_1'''$, $G_1'''$ relative to the corresponding projections of the object M on the plane $R^1$, Figure 6, is equal to the ratio of $$\overline{P_1 P_1'''} \pm D \text{ to } \overline{P_1 P_1^0},$$

where D is the separation of the principal points of the lenses $22_1$, $22_2$. Let this ratio, or scale, be designated $1/N_1$.

Let $P_1^{0'''}$, $P_2^{0'''}$ be the images of the negatives $G_1'''$, $G_2'''$ of the crosses at the points $P_1^0$, $P_2^0$ respectively. The negatives $G_1'''$, $G_2'''$ are placed in the plane $r''$, Figure 7, situated with respect to the plane $r'$ so that the ratio of $$\overline{p_1 P_1'''} \pm d \text{ to } p_1 p_1^0$$

is equal to $n/N$, where $d$ is the separation of the principal points of the lenses $23_1$, $23_2$, and $P_1'''$ is the point where the axis $x_1$ cuts the plane $r''$. The negatives $G_1'''$, $G_2'''$ are placed in the cameras $K_1'$, $K_2'$ with the images $P_1'''$, $P_2'''$ on the respective axes $x_1$, $x_2$, cf. Figures 6 and 7, and the said negatives are rotated about the axes $x_1$, $x_2$ until the projected images $P_1^{0'''}$, $P_2^{0'''}$ of the points $P_1^0$, $P_2^0$, Figure 6, fall on the surface $r'$ at the points $p_1^0$, $p_2^0$, Figure 7.

When the apparatus is adjusted as described the projected images are viewed stereoscopically, the model formed, sensitized, printed, etc., as hereinbefore described in connection with the apparatus shown in Figure 3.

The cameras $K_1$, $K_2$, $K_1'$, $K_2'$ are equipped with adjustments, etc., similar to those shown in connection with the cameras in Figure 3. The lenses $23_1$, $23_2$ are chosen of equal focal length such that the image plane $r'''$ of the plane $r''$, Figure 7, when the cameras are adjusted as described, coincides with the estimated average plane of the surface of the finished model. Sources of light, condensing lenses, etc., not shown, are provided for projecting images of the negatives $G_1$, $G_2$. The model is formed from the block of plaster of Paris 17, placed as shown in Figure 7.

Figure 8 shows a section O of terrain as it occurs in nature, and a section O' of an augmented relief model of the same terrain, made by the process herein described. Figure 9 shows a section Q of an object and a section Q' of a diminished relief model of the same object, made by the said process. The value of $n$ employed in making the model O' is greater than unity, that employed in making Q' is less than unity.

It will be noticed in connection with the apparatus shown in Figure 3 that there is danger of interference between the two cameras if the photographs are taken from positions close together, and that the small clearance between the two cameras may be a handicap to the worker in attempting to view the stereoscopic images. These difficulties may be overcome by use of the preferred type of apparatus shown in Figures 10 and 11. The axes of the main bodies of the two identical cameras shown are horizontal. Rays from the negatives $G_2'''$ impinge on the 45° externally reflecting mirror 24 and subsequently pass down through the lens 7 to the block 19, as though they had proceeded undeflected from $G_2''''$, the image of the negative $G_2'''$ formed by reflection at the plane 25. Stereoscopic or anaglyphic vision of the images from the two negatives may be had by means of the rotating shutter 26, Figure 12, which operates to give alternate views in rapid succession of the projections of the two negatives. The construction of the apparatus will be clear from Figure 10 together with the description of the construction and operation of the apparatus shown in Figure 3, corresponding parts of the two types of apparatus shown in Figures 3 and 10 being similarly designated. In Figure 10 the height of the lens 7 is controlled by the movable member 3 and set screw 4. The position of the negative $G_2'''$ is controlled by the movable member 8 and rotatable plate-holder 10. It is adjusted so that its image $G_2''''$ occupies the position specified in connection with the operation of the apparatus of Figure 3. Further description of the construction and operation of the apparatus of Figure 10 will be unnecessary, as they will be readily understood by anyone familiar with the art. It is to be noted, however, that the negative $G_2'''$ must be placed with its image side turned away from the lens 7, to counteract the reversing effect of the mirror 24, and the same precaution applies of course to the negative $G_1'''$. The negatives $G_1'''$, $G_2'''$ should be on very thin glass or celluloid, to reduce distortion effects.

I claim:

1. The method of photosculpture which consists in the steps of obtaining a pair of photographs of the work in rectified perspective, such photographs being originally taken from different positions, selecting one or more identifiable points (as may be necessary for solution) in said photographs whose positions are known with respect to a given plane of reference (first plane), plotting the projections of said points on the plane of reference of the photosculpture (second plane) in accordance with a scale denoted by N, locating positions of said points above said second plane of reference in directions normal to said second plane and at distances therefrom corresponding to the height of said points in nature above said first reference plane on a scale which is equal to the $$\frac{n}{N}$$

(where $n$ equals the vertical scale), then obtaining optical coincidence between said point or points in space above the second plane of reference thus established and images of the corresponding points in each of said photographs whereby said photographs (or suitable reproductions thereof) are oriented and then ascertaining the positions of additional points in space above said second plane of reference to give the desired configuration by observing where the projected images of said additional points in each of said photographs coincide.

2. The method of photosculpture which consists in the steps of obtaining a pair of photographs of the work in rectified perspective, such photographs being originally taken from different positions, selecting one or more identifiable points (as may be necessary for solution) in said photographs whose positions are known with respect to a given plane of reference (first plane) plotting the projections of said points on the plane of reference of the photosculpture (second plane) in accordance with a scale denoted by N, locating positions of said points above said second plane of reference in directions normal to said second plane and at distances therefrom corresponding to the height of said points in nature above said first reference plane on a scale which is equal to the $$\frac{n}{N}$$

(where $n$ equals the vertical scale), then obtaining optical coincidence between said point or points in space above the second plane of reference thus established and images of the corresponding points in each of said photographs whereby said photographs (or suitable reproductions thereof) are oriented and then ascertaining the positions of additional points in space above said second plane of reference to give the desired configuration by observing where the projected images of said additional points in each of said photographs coincide, and continuing the method by sculpturing a model as determined by such ascertained points, then sensitizing the surface of such model and photographing thereon the image of at least one of said photographs and then photographically developing the image so formed.

3. The method of making relief maps which consists in obtaining photographs of the terrain to be mapped, then forming images of points in said photograph upon a plastic mass in such a manner so as to reproduce upon a smaller scale the positions in space of said points in nature, then sculpturing said mass as determined by said points, photographing thereon the images of at least one of the photographs taken and photographically developing the images so formed.

4. The method of making relief maps which consists in obtaining photographs of the terrain to be mapped, then forming images of points in said photograph upon a plastic mass in such a manner so as to reproduce upon a smaller scale the positions in space of said points in nature but upon an enlarged vertical scale with respect to the horizontal scales, then sculpturing said mass as determined by said points, photographing thereon the images of at least one of the photographs taken and photographically developing the images so formed.

5. The method of making relief maps which consists in molding a relief of the map on a scale smaller than nature and so as to correspond with the terrain as revealed by one or more photographs thereof, and then photographing in registry therewith an image of said terrain as obtained from a photograph thereof.

6. The method of making relief maps which consists in molding a relief of the map on a vertical scale smaller than nature but enlarged with respect to the horizontal scales and so as to correspond with the terrain as revealed by one or more photographs thereof, and then photographing in registry therewith an image of said terrain as obtained from a photogragh thereof.

7. The method of making reliefs which consists in obtaining at least a pair of photographs of the object in nature in rectified perspective, said photographs having been obtained from different lens positions, projecting images of corresponding points of said photographs, adjusting the photographs so as to obtain coincidence of a plurality of points, and then while maintaining the photographs in such adjusted position forming the relief as determined by the coincidence of a sufficient number of points in the photographs.

HEREWARD LESTER COOKE.